(12) United States Patent
Aleksandrovich et al.

(10) Patent No.: US 11,507,554 B2
(45) Date of Patent: Nov. 22, 2022

(54) TREE-LIKE METADATA STRUCTURE FOR COMPOSITE DATASETS

(71) Applicant: YAHOO ASSETS LLC, Dulles, VA (US)

(72) Inventors: George Aleksandrovich, Hoffman Estates, IL (US); Allie K. Watfa, Urbana, IL (US); Robin Sahner, Urbana, IL (US); Mike Pippin, Sunnyvale, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 384 days.

(21) Appl. No.: 16/727,172

(22) Filed: Dec. 26, 2019

(65) Prior Publication Data
US 2021/0200732 A1 Jul. 1, 2021

(51) Int. Cl.
*G06F 16/22* (2019.01)
*G06F 16/2457* (2019.01)
*G06F 16/2455* (2019.01)
*G06F 16/242* (2019.01)

(52) U.S. Cl.
CPC ...... *G06F 16/2246* (2019.01); *G06F 16/2282* (2019.01); *G06F 16/244* (2019.01); *G06F 16/2456* (2019.01); *G06F 16/24573* (2019.01)

(58) Field of Classification Search
CPC ............ G06F 16/24573; G06F 16/244; G06F 16/2456; G06F 16/2246; G06F 16/2282
USPC ........................................................ 707/797
See application file for complete search history.

(56) References Cited

U.S. PATENT DOCUMENTS

| | | | |
|---|---|---|---|
| 4,177,510 A * | 12/1979 | Appell | G06F 12/1491 |
| | | | 711/163 |
| 9,588,749 B2 * | 3/2017 | Chen | G06F 8/64 |
| 10,178,190 B2 * | 1/2019 | Qiao | G06Q 30/0269 |
| 10,733,198 B1 * | 8/2020 | Marschner | G06F 16/252 |
| 10,824,606 B1 * | 11/2020 | Kandel | G06F 16/215 |
| 10,997,137 B1 * | 5/2021 | Goyal | G06F 16/24573 |
| 2005/0091233 A1* | 4/2005 | Friske | G06F 16/213 |
| | | | 707/804 |
| 2007/0011668 A1* | 1/2007 | Wholey | G06F 8/34 |
| | | | 717/113 |
| 2010/0076818 A1* | 3/2010 | Peterson | G06Q 30/02 |
| | | | 705/14.44 |
| 2011/0295795 A1* | 12/2011 | Venkatasubramanian | |
| | | | G06F 16/254 |
| | | | 707/602 |
| 2013/0332449 A1* | 12/2013 | Amos | G06F 16/2452 |
| | | | 707/798 |
| 2014/0039943 A1* | 2/2014 | Ghindici | G06Q 10/02 |
| | | | 705/5 |

(Continued)

*Primary Examiner* — Shahid A Alam
(74) *Attorney, Agent, or Firm* — James J. DeCarlo; Greenberg Traurig, LLP

(57) ABSTRACT

Disclosed are embodiments for generating metadata files for composite datasets. In one embodiment, a method is disclosed comprising generating a tree representing a plurality of datasets; parsing the tree into an algebraic representation of the tree; identifying a plurality of terms in the algebraic representation, each term in the terms comprising at least two factors, each of the two factors associated with a dataset in the plurality of datasets; generating a metadata object of the plurality of terms; serializing the metadata object to generate serialized terms; and storing the serialized terms in a metadata file associated with the plurality of datasets.

20 Claims, 7 Drawing Sheets

(56) References Cited

U.S. PATENT DOCUMENTS

| | | | | |
|---|---|---|---|---|
| 2015/0234870 A1* | 8/2015 | Kumar | | G06F 16/13 |
| | | | | 707/807 |
| 2016/0092544 A1* | 3/2016 | Shivarudraiah | | G06F 16/278 |
| | | | | 707/600 |
| 2016/0171092 A1* | 6/2016 | Mueller | | G06N 5/022 |
| | | | | 707/771 |
| 2017/0109448 A1* | 4/2017 | Adamy | | G06F 16/24578 |
| 2018/0285097 A1* | 10/2018 | Radermacher | | G06F 16/2282 |
| 2018/0357239 A1* | 12/2018 | Alonso | | G06F 16/24578 |
| 2018/0373547 A1* | 12/2018 | Dawes | | H04N 21/4788 |
| 2019/0114335 A1* | 4/2019 | Koenig | | G06F 16/254 |
| 2020/0394166 A1* | 12/2020 | Vanhooser | | G06F 16/215 |
| 2020/0409952 A1* | 12/2020 | Dean | | G06F 16/9024 |

* cited by examiner

TREE-LIKE METADATA STRUCTURE FOR COMPOSITE DATASETS

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments relate to distributed data processing and, in particular, to techniques for generating tree-like metadata descriptors for composite datasets in a distributed processing environment.

In big data and distributed processing systems such as Hadoop, it is common to amass large data sets based on, for example, high-velocity data such as clickstream data. For downstream processing of such data, it is frequently common to add additional data to the original data sets (referred to as annotating data). In current systems, adding annotations involves a duplication of the original data, forming a new dataset that includes the original data and the new annotation data. For example, annotating clickstream data comprises copying the entire clickstream data set and adding one or more columns to the data set and then populating these new columns with the annotation data. The result is that current systems are required to read and process entire data sets as well as duplicate the same data across additional files. Frequently, this copying is also performed multiple times as annotations can be added on already annotate data. Thus, if a previously annotate dataset is annotated again, the original data is copied twice, resulting in three copies of the same data.

BRIEF SUMMARY

Currently, systems utilize tree-based systems for managing relations between datasets. These tree structures are useful in describing the relations between datasets; however, they suffer from numerous drawbacks. First, the tree structures include significant storage overhead for storing the relations. Second, traversal operations are computationally expensive. Third, the trees are often unbalanced, resulting in inefficient access.

Thus, there is a current need in the art to provide a technique for efficiently generating metadata files for composite datasets.

The disclosed embodiments solve these and other technical problems by providing a storage layer for a distributed storage system that allows for the creation and access of annotation data layers. In some embodiments, the disclosed embodiments are provided as a storage layer on a Hadoop system, although the disclosed embodiments are not limited to such a system. The various techniques described herein may be implemented as a hybrid file format implemented as a thin wrapper layer on a distributed file system.

In one embodiment, a method is disclosed comprising generating a tree representing a plurality of datasets; parsing the tree into an algebraic representation of the tree; identifying a plurality of terms in the algebraic representation, each term in the terms comprising at least two factors, each of the two factors associated with a dataset in the plurality of datasets; generating a metadata object of the plurality of terms; serializing the metadata object to generate serialized terms; and storing the serialized terms in a metadata file associated with the plurality of datasets.

In another embodiment, a non-transitory computer-readable storage medium for tangibly storing computer program instructions capable of being executed by a computer processor is disclosed, the computer program instructions defining the steps of generating a tree representing a plurality of datasets; parsing the tree into an algebraic representation of the tree; identifying a plurality of terms in the algebraic representation, each term in the terms comprising at least two factors, each of the two factors associated with a dataset in the plurality of datasets; generating a metadata object of the plurality of terms; serializing the metadata object to generate serialized terms; and storing the serialized terms in a metadata file associated with the plurality of datasets.

In another embodiment, an apparatus is disclosed comprising: a processor; and a storage medium for tangibly storing thereon program logic for execution by the processor, the stored program logic causing the processor to perform the operations of generating a tree representing a plurality of datasets; parsing the tree into an algebraic representation of the tree; identifying a plurality of terms in the algebraic representation, each term in the terms comprising at least two factors, each of the two factors associated with a dataset in the plurality of datasets; generating a metadata object of the plurality of terms; serializing the metadata object to generate serialized terms; and storing the serialized terms in a metadata file associated with the plurality of datasets.

DETAILED DESCRIPTION

Figure 1:
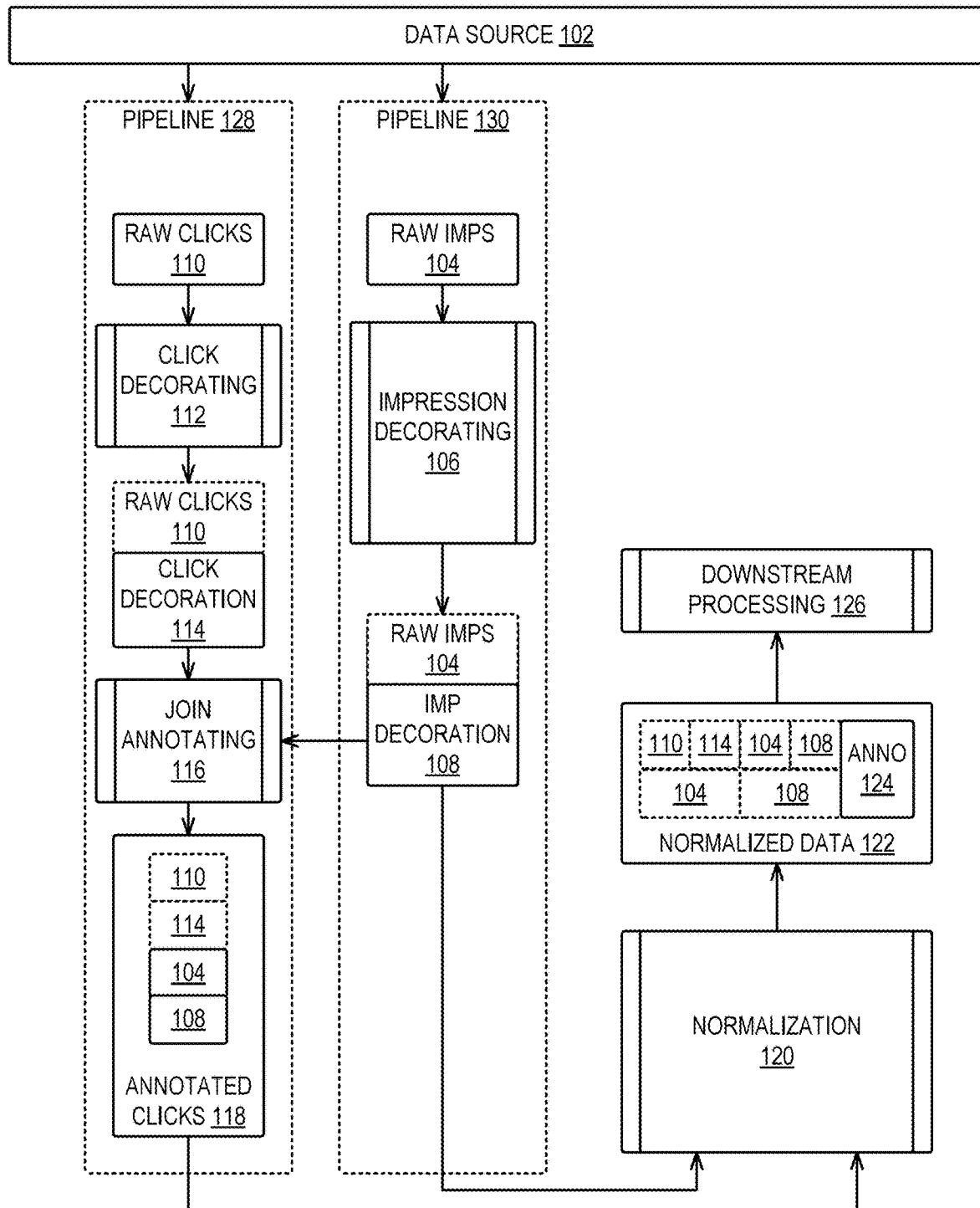
FIG. 1 is a system diagram illustrating a distributed processing system according to some embodiments of the disclosure.

FIG. 1 is a system diagram illustrating a distributed processing system according to some embodiments of the disclosure.

In the illustrated embodiment, a plurality of pipelines (128, 130) process data from a data source (102). In one embodiment, data source (102) can comprise a data lake or similar big data storage device. In the illustrated embodiment, the data source (102) can include a large volume of unstructured data. In some embodiments, the data source (102) can include structured data such as column-oriented data. In some embodiments, the data source (102) can comprise log file data storage or similar types of storage. In some embodiments, the data source (102) stores data in structured filetypes such as Orc or Parquet filetypes.

In the illustrated embodiment, the pipelines (128, 130) comprise distributed processing pipelines. Each pipeline (128, 130) may comprise a plurality of distributed computing devices. In one embodiment, each pipeline (128, 130) can read data from the data source (102), process the data, and load the data into a structured data repository. In some embodiments, all of the above processing may be done in a distributed computing environment running on commodity hardware (e.g., a Hadoop cluster or similar cluster).

The illustrated pipelines (128, 130) further illustrate an annotation workflow. As used herein, annotation refers to the processing of stored data to add new data or supplement the data with existing data. Data to be annotated is referred to as raw data or a raw data set. Additions to the raw data are referred to as annotated data. A combination of raw data and annotated data is referred to as composite data.

In the pipeline (130), raw impression data (104) is received. The use of impression data is provided as an example, and other data types may be used. The embodiments place no limit on the underlying type of data processed herein. The raw impression data (104) can refer to data regarding the display of content in webpages (e.g., the time viewed, the owner of the content, etc.). Raw impression data (104) is generally amassed via log files that log the selection and display of content. In the illustrated embodiment, the raw impression data (104) can comprise a plurality of database columns and rows. In some embodiments, this data can be stored in Orc, Parquet, or other column-oriented data formats.

The raw impression data (104) is processed during an impression decorating stage (106). In the illustrated embodiment, the impression decorating stage (106) can comprise a Pig or Hive script or other similar data processing script. Generally, the impression decorating stage (106) performs one or more operations on the raw impression data (104). For example, the impression decorating stage (106) can add additional columns to the raw impression data or can alias column names.

The output of the impression decorating stage (106) is an impression annotation data set, also referred to as a decorated impression data set (108). As illustrated, the impression decorating stage (106) does not copy the raw impression data (104) to a new location. Instead, the raw impression data (104) is locally processed. That is, the impression decorating stage (106) can comprise a distributed algorithm that is run on the same device that is storing the raw impression data (104). In contrast, however, the decorated impression data (108) is written to disk after being created. In the illustrated embodiment, the decorated impression data set (108) comprises a set of columns capturing only the new data to decorate the raw impression data. The decorated impressions (108) and raw impressions (104) are accessed by pipeline (128) to annotate a clickstream further, as described herein.

Similar to the pipeline (130), pipeline (128) receives raw click data (110). In one embodiment, raw click data (110) can comprise data regarding user selection of digital content. For example, while raw impression data (104) can include rows for each time a piece of content is displayed on a web page, raw click data (110) can include rows for each time that content is selected by a user.

Similar to the impression decorating stage (106), the click decorating stage (112) adds one or more columns or fields to the raw data. As in stage (106), the click decorating stage (112) generates these additional columns for fields as a physically distinct file (114). Thus, the click decorating stage (112) does not modify or copy the raw click data (110) when generating the decorate click data (114).

In the illustrated embodiment, a join annotating stage (116) receives the raw click and impression data (110, 104) and the decorated clicks and impressions (114, 108). In some embodiments, the join annotating stage (116) copies the impression data (104, 108) to form the annotated clicks data set (118). In one embodiment, the join annotating stage (116) filters the impression data (104, 108) to identify only that impression data relevant to the click data (110, 114) and uses the filtered data as an annotation set to generate the annotated clicks.

In the illustrated embodiment, a normalization stage (120) is configured to receive the combined impression composite data set (104, 108) and the composite annotated clicks data set (118). In one embodiment, the normalization stage (120) is configured to add a further annotation to the composite data sets. For example, the normalization stage may perform grouping or sorting of the data as well as synthesized columns based on aggregations of the underlying data. As a result, the normalization stage (20) generates a normalized annotation data set (122). As illustrated, only the annotations (124) are written to disk during this stage, and the remaining data (104, 108, 110, 114) is not copied to a new location on disk.

Finally, the normalized annotation data set (112) is provided to downstream processing applications for analysis, further processing, and storage, as required by such applications. As indicated in the figure via dotted lines, data sets in the pipelines are not copied during the annotation phases. The result is that the normalized data (122) can include the annotation results of the pipeline (128, 130) stages, the normalization annotations, and the raw underlying data without incurring the computationally expensive copying costs required by existing solutions. Specific methods for avoiding this unnecessary copying are described in more detail herein in the context of a distributed computing platform such as Hadoop.

Figure 2A:
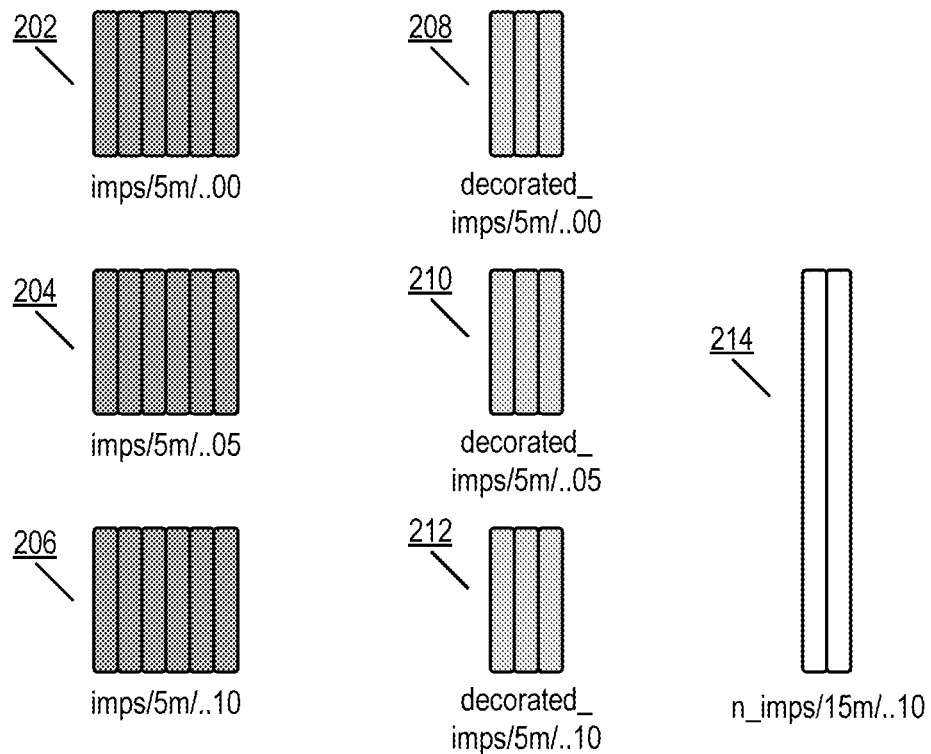
FIG. 2A illustrates the physical storage layout of a distributed processing system according to some embodiments of the disclosure.

FIG. 2A illustrates the physical storage layout of a distributed processing system according to some embodiments of the disclosure.

In the illustrated embodiment, a set of rows and columns representing raw data is stored at three locations (202, 204, 206). As one example, these locations (202, 204, 206) can comprise three physically distinct storage devices storing a portion of the entire data set represented by the portions. In one embodiment, each location (202, 204, 206) comprises a file, and each file can be stored on the same or different computing devices.

In addition to raw data (202, 204, 206), decoration data is stored in three locations (208, 210, 212). Similar to locations (202, 204, 206), the decoration data is stored in individual files stored on the same or different computing devices. Notably, the decoration data is stored in files separate from the raw data.

Finally, the second level of annotation data is stored at location (214). Again, this location comprises a separate file from the previous locations (202 through 212). Thus, each set of annotations is stored in physically separate files or other structures. Further, there is no limitation on the mapping of the number of files between raw data and annotations. As illustrated, raw data is stored in three files at three locations (202, 204, 206).

Similarly, second level annotation data is also stored in three files at three locations (208, 210, 212). However, the final layer of annotation data is stored in a single file at one location (214). To facilitate this, each annotation structure includes a row identifier that will be described in more detail herein that enables the stitching together of raw data and annotations during processing.

Figure 2B:
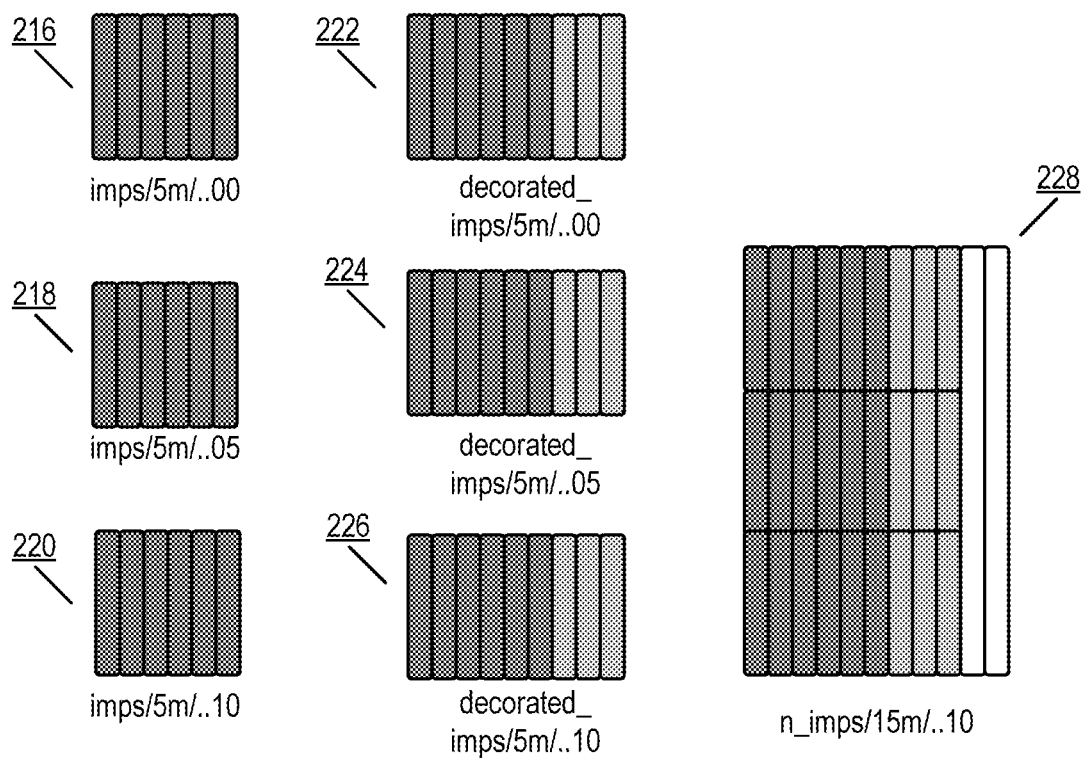
FIG. 2B illustrates the logical storage layout of a distributed processing system according to some embodiments of the disclosure.

FIG. 2B illustrates the logical storage layout of a distributed processing system according to some embodiments of the disclosure.

The illustrate storage layout comprises a logical view of the same data depicted physically in FIG. 2A. The illustrated view represents the view of data presented to downstream applications accessing the annotation data sets. In the illustrated embodiment, raw data sets are stored at first locations (216, 218, 220), first annotations are stored at second locations (222, 224, 226), and a third annotation is stored at a third location (228). When accessing the first annotations (222, 224, 226), a downstream processing algorithm accesses both the annotations (e.g., 208) and the raw data (e.g., 202) when accessing the second location (222). Further, when accessing the third location (228), the entire annotation data set appears as a single logical data set while comprising separate physical files.

Figure 3A:
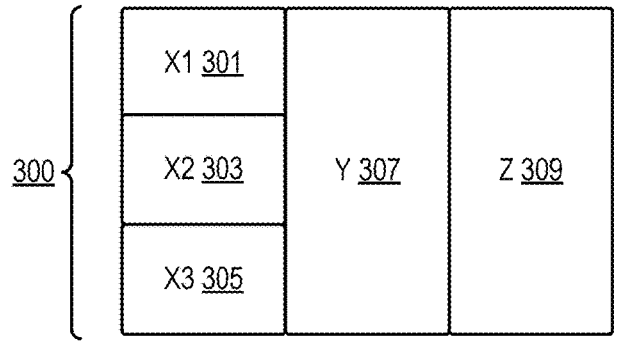
FIG. 3A is a diagram illustrating the representation of a composite dataset according to some embodiments of the disclosure.
Figure 3A:
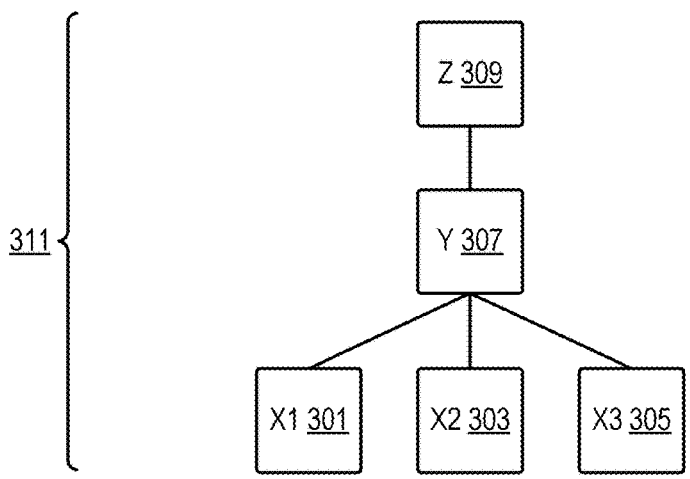

FIG. 3A is a diagram illustrating the representation of a composite dataset according to some embodiments of the disclosure.

In the illustrated embodiment, a dataset (300) includes a set of three root dataset segments (301, 303, 305) referred to as X1, X2, and X3, respectively. These three dataset segments (301, 303, 305) comprise a vertical union of datasets forming a single combined root dataset. For example, each of the dataset segments (301, 303, 305) may comprise segments of time series data combined into an aggregated time series root dataset. For example, dataset segments (301, 303, 305) may comprise clickstream data recorded over consecutive five-minute intervals and thus, the combined root dataset comprises a fifteen-minute clickstream dataset.

Annotation dataset (307) (referred to as Y) comprises a separate dataset (stored independently) that annotates the dataset segments (301, 303, 305) with additional columns. As discussed, these columns may be derived based on the content of dataset segments (301, 303, 305) or may comprise independently generated values. In the illustrated embodiment, the rows of dataset segments (301, 303, 305) are aligned with the rows of the annotation dataset (307). Similarly, the composite dataset includes a second annotation dataset (309) (referred to as Z). This dataset (309) may be generated independently of the dataset (307) but may be similarly structured.

The illustrated dataset (300) generally corresponds to a logical view of a composite dataset as it is stored on disk. That is, each dataset (301, 303, 305, 307, 309) may be stored as a separate file or as a group of closely related files.

In the illustrated embodiment, a tree (311) can be constructed to represent the relationship between the datasets (301, 303, 305, 307, 309). In the illustrated embodiment, the tree (311) is built from the right-most annotation dataset (Z). As used herein, right-most generally refers to the most recently created dataset. In other embodiments, any dataset may be used. In these embodiments, the tree (311) may only include descendant nodes (e.g., 307, 301, 303, 305). However, in other embodiments, the tree (311) can be generated by traversing upward from the intermediate node.

In the illustrated embodiment, a root node (Z) includes one child node (Y). This relationship represents a horizontal union of equal-length datasets (i.e., datasets having the same number of rows). The intermediate node (Y) is then connected to three leaf nodes (X1, X2, X3). Multiple child nodes indicate a vertically joined dataset that is horizontally joined to the parent node. Thus, in the illustrated example, the child nodes (X1, X2, X3) are vertically joined and then horizontally joined to intermediate dataset (Y). In the illustrated embodiment, a leaf node represents a root dataset or partial root dataset.

In the illustrated embodiment, the tree (311) can be converted into an algebraic representation (313) of the datasets. In the illustrated embodiment, nodes having the same depth, and sharing a parent node can be represented as a sum (X1+X2+X3). Parent-child relationships can then be represented as products (e.g., Y·Z). In this manner, the tree (311) is represented as (X1+X2+X3)·Y·Z.

Finally, the algebraic representation (315) can then be factored into a flattened representation (315). To obtain this representation, algebraic properties can be applied to the intermediate representation (313) to obtain a set of terms representing the composite dataset: X1·Y·Z+X2·Y·Z+X3·Y·Z. This flattened representation (315) can then be stored in metadata associated with a given dataset, as described in more detail herein.

Figure 3B:
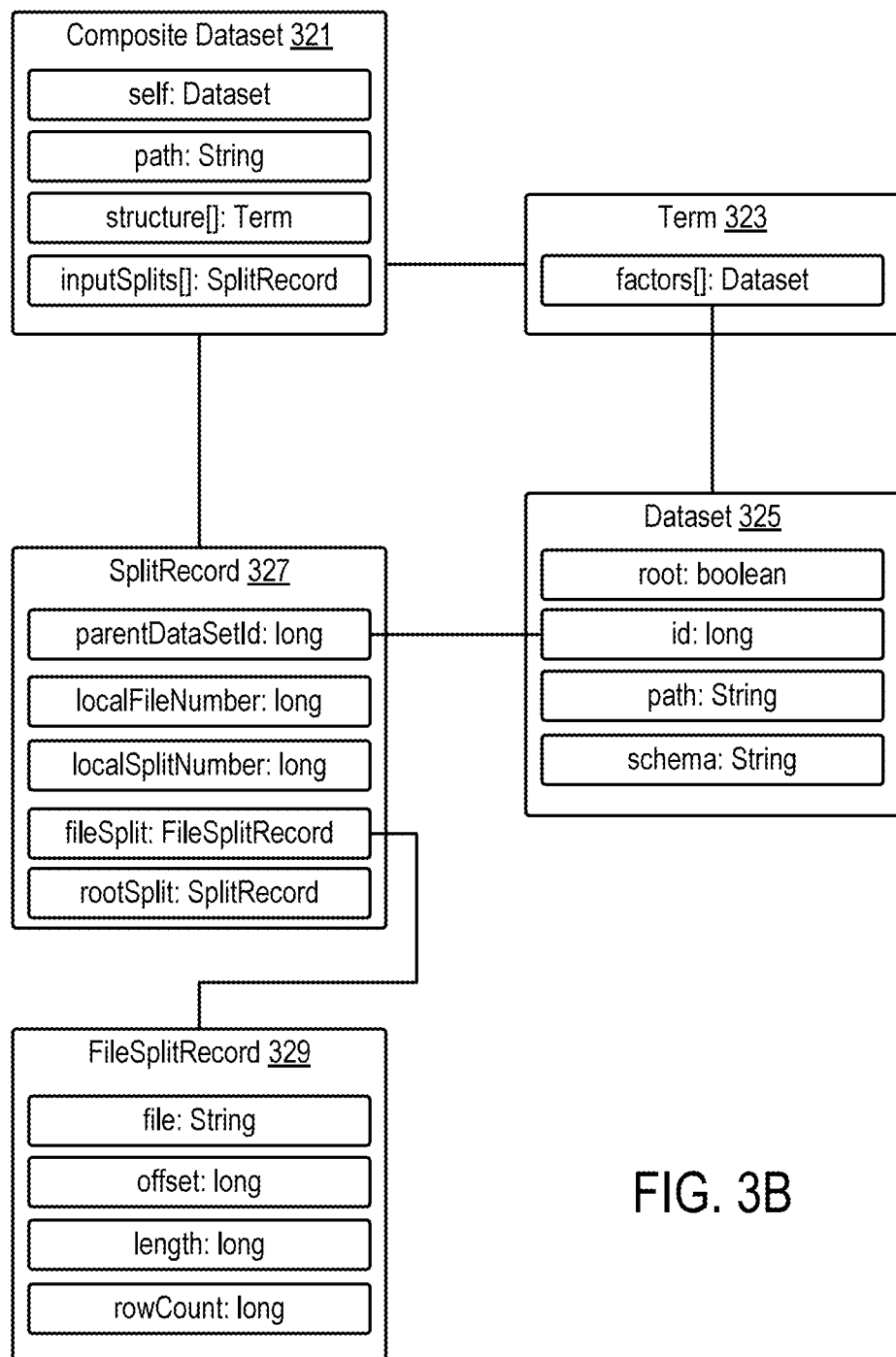
FIG. 3B is a class diagram illustrating a metadata object for a composite dataset according to some embodiments of the disclosure.

FIG. 3B is a class diagram illustrating a metadata object for a composite dataset according to some embodiments of the disclosure.

In the illustrated embodiment, a composite dataset is represented by an object (321). This object (321) is then serialized to generate a metadata file for a given composite dataset. In some embodiments, the object (321) can be serialized into a binary format. In other embodiments, the object (321) can be serialized into a text format (e.g., JavaScript Object Notation (JSON)).

The composite data set object (321) includes a "self" property that comprises a dataset object (discussed in connection with 325). This "self" property represents inter alia the structure of the actual annotation data and storage mechanics. In some embodiments, the properties in a dataset object (e.g., 325) may be flattened into top-level properties of the composite dataset object (321).

The composite data set object (321) additionally includes a path property. The path property represents the location of the given composite dataset on disk and may comprise a relative or, more commonly, an absolute path. In addition to the self and path properties, the composite dataset object (321) may further include various properties such as an identifier that uniquely identifies the dataset in the system. The composite data set object (321) may also include a file count property that represents the number of files constituting the composite dataset. The composite data set object (321) may include a property identifying the number of splits per file and a property identifying the number of rows per split.

The composite data set object (321) additionally includes an inputSplits property. This property comprises an array of SplitRecord objects (described in connection with element 327). This array of SplitRecord objects describes the splits associated with each dataset.

As illustrated, the composite data set object (321) also includes a structure property that represents the flattened, algebraic representation of the composite dataset, described above. The structure property comprises a set of terms (323) that define the structure of the composite dataset. Each term is a summand in the algebraic representation and contains a dataset element for each factor (described in connection with element 325). In the example depicted in FIG. 3A, the structure property would include three terms: $X1 \cdot Y \cdot Z$, $X2 \cdot Y \cdot Z$, and $X3 \cdot Y \cdot Z$ In the illustrated embodiment, a term (323) includes a factors property. The factors property comprises an array of dataset objects (e.g., 325). In the example, depicted in FIG. 3A the term $X1 \cdot Y \cdot Z$ would include three factors of $X1$, $Y$, and $Z$.

Each dataset is represented by a dataset object (325). A dataset comprises a directory in the grid storage of the distributing computing environment. In some embodiments, the dataset objects may be normalized such that only one unique copy of a dataset object is stored in the class. In the example in FIG. 3A, only five dataset objects would be instantiated: X1, X2, X3, Y, and Z. Each dataset object (325) has a root property, which indicates whether the dataset is a root or annotation dataset. If true, the dataset comprises the first factor in a term and is used to identify the starting point of the summands. The dataset object (325) additionally includes an identifier (id) property that comprises a unique identifier for the dataset and a path property that identifies the location (absolute or relative) of the dataset on disk. The id is created as a hash using the absolute path to the data and the current time.

The dataset object (325) additionally includes a schema property. In some embodiments, the schema property will include the column names and associated data types for the dataset. In alternative embodiments, the schema property includes only the column names for the dataset. In some embodiments, the schema property comprises a JSON string. In some embodiments, the schema may be in the Avro data format.

As discussed above, the composite dataset object (321) includes a splits property that includes one or more SplitRecord objects. Each SplitRecord object includes details regarding the splits of a given dataset, as described in more detail herein.

A SplitRecord object (327) identifies the details of splits within a given dataset. In some embodiments, a split refers to a file-based split object or a stripe-based split object and generally includes a subset of the total rows of a given dataset. As illustrated, a SplitRecord object (327) includes a parentDataSetId property that identifies the dataset the SplitRecord is associated with. The SplitRecord object (327) includes a fileSplit property that comprises a FileSplitRecord object (329). The fileSplit property represents details generated when implementing a file-based split operation. Alternatively, the fileSplit property may comprise a stripe split property. As illustrated, the FileSplitRecord object (329) includes a file property (identifying the location of the file), an offset property (identifying the offset of the contents of the file in the overall data), a length property (identifying the length of the data in the file), and a rowCount property (identifying the number of rows in the file).

The SplitRecord object (327) additionally includes localFileNumber and localSplitNumber properties. These properties represent the corresponding file number and split number, respectively, for a given SplitRecord. In some embodiments, the SplitRecord object (327) may include further properties describing the details of a given file split or stripe split. In some embodiments, this parameter can refer to an object, including the location of the file/stripe, offset, length, row count, and other details regarding the format of the underlying storage.

Finally, the SplitRecord object (327) includes a rootSplit property that comprises a FileSplitRecord object (329). The rootSplit property represents a split record for the root dataset to which this split is aligned. For a root dataset, this property is set to null.

As will be described in connection FIG. 4A, the foregoing relationship of objects can be stored in memory during processing and serialized to a text or binary format for storage as metadata.

Figure 4A:
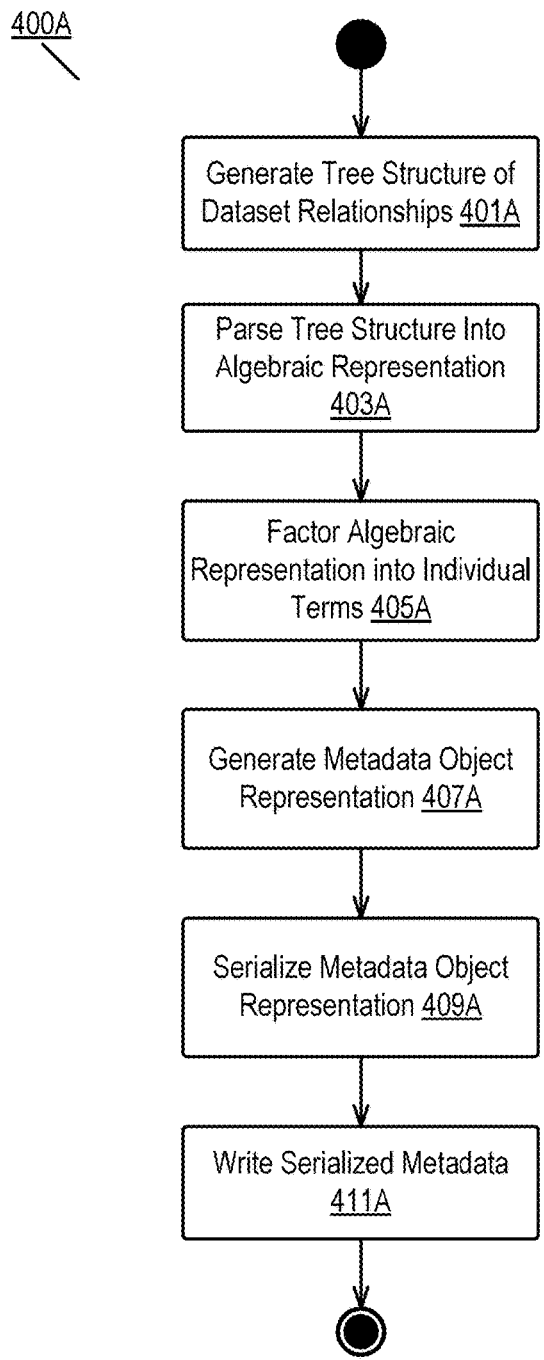
FIG. 4A is a flow diagram illustrating a method for generating metadata describing a composite data set according to some embodiments of the disclosure.

FIG. 4A is a flow diagram illustrating a method for generating metadata describing a composite data set according to some embodiments of the disclosure.

In step 401a, the method (400a) generates a tree structure of dataset relationships. In one embodiment, the method (400a) receives data regarding a set of datasets. In one embodiment, this data includes a set of existing datasets and a new (annotation) dataset. Each dataset is associated with properties as described in FIG. 3B.

In one embodiment, the method (400a) generates a tree by starting with the right-most dataset. In general, the "right-most" dataset refers to the newest dataset, newest referring to the creation of the dataset. Generally, in step 401a, the method (400a) will identify a new annotation dataset as the right-most dataset since this dataset will be "appended" to the other datasets as illustrated in FIG. 3A (dataset Z). In general, a set of command will load a set of existing datasets (e.g., using a LOAD command in the Pig language) and will decorate or annotate these existing datasets with new or right-most data.

In the illustrated embodiment, the method (400a) generates the tree solely in memory and does not persist the tree structure itself to disk. In the illustrated embodiment, the method (400a) begins by setting the right-most annotation dataset as the root of the tree. The method (400a) then analyzes the immediate dataset to the "left" of the right-most annotation dataset. In the example provided in FIG. 3A, this would comprise dataset Y. The method (400a) continues this right-to-left traversal until processing all datasets. Generally, root datasets will comprise the left-most datasets (e.g., datasets X1, X2, X3 in FIG. 3A).

When generating the tree, the method (400a) analyzes the structure of the datasets. If a given dataset comprises a single set of data, the method (400a) simply adds the dataset as a child node of the preceding node. However, if the dataset comprises a vertical union of separate datasets, the method (400a) represents each component of the vertical union as nodes at the same depth in the tree.

The foregoing process may be cumulative. That is, when generating a root dataset, the method (400a) may generate and store (described below) the tree representation as a single node (or set of vertically joined nodes). When the next annotation dataset, the method (400a) may retrieve that stored representation and re-build the tree based on the representation. The method (400a) may then add the current annotation dataset as a new root node. In this manner, after creating the root dataset(s), the method (400a) can simplify step 401a as only adding a new root node to an existing tree rather than re-creating the entire tree.

In step 403a, the method (400a) parses the tree generated in step 401 into an algebraic representation.

In the illustrated embodiment, the method (400a) generates the algebraic representation by traversing the tree. In the illustrated embodiment, the method (400a) starts at the root node and sets the root node as a first factor. The method (400a) then traverses to the next level of the tree. If multiple child nodes are at this level, the method (400a) combines these nodes using an addition (summation) operation. In only one child node is present, the method (400a) uses this node as-is. The method (400a) then generates a product combining the second level and first level. The method (400a) repeats this process for all remaining levels of the tree. The resulting representation comprises an algebraic formula of products and summations. Although described as an algebraic representation, the resulting representation is stored as a data structure representing the relations between nodes of the tree.

In step 405a, the method (400a) factors the algebraic representation into individual terms. In the illustrated embodiment, the result of step 403a comprises a product of terms, where each term comprises either a single variable (dataset) or a summation of variables. In step 405, the method (400a) expands this representation by multiplying the terms to obtain a series of terms as a summation. This operation is described more fully in the description of FIG. 3A, which is incorporated herein and not repeated.

In step 407a, the method (400a) generates a metadata object representation of the terms.

In the illustrated embodiment, the method (400a) analyzes each term in the set of terms and retrieves the data received in step 401a and builds an object-oriented representation of the datasets based on the terms. This object representation is depicted in FIG. 3B.

In one embodiment, the method (400a) stores the individual terms in an array of terms in the object representation. The method (400a) will additionally retrieve all metadata associated with each unique dataset in the terms and store the details of these datasets in the metadata object representation.

In step 409a, the method (400a) serializes the metadata object representation.

In one embodiment, the method (400a) can serialize the metadata object representation by traversing the properties of the object and generating a JSON, XML, or other text-based representation of the object. In this embodiment, the property labels comprise the keys (or XML elements), while the property values comprise the values of the corresponding keys or elements.

In other embodiments, the method (400a) may serialize the metadata object representation by marshaling the metadata object representation into a binary representation. For example, the method (400a) may utilize a protocol buffer format to serialize the metadata object representation into a binary wire format. In some embodiments, the method (400a) may first serialize the metadata object representation and then convert the plain-text representation of the serialized metadata object representation into a binary format.

In step 411a, the method (400a) writes the serialized metadata object representation as a metadata file. In some embodiments, the method (400a) writes the metadata object to the same disk location that stores the underlying annotation dataset received in step 401a. In other embodiments, the method (400a) may transmit the metadata file to a centralized metadata storage device. In some embodiments, the metadata file may comprise a partial metadata file representing only part of an annotation dataset. In these embodiments, the centralized metadata storage device may analyze multiple such partial metadata files and construct a similarly formatted metadata file based on the partial metadata files.

Figure 4B:
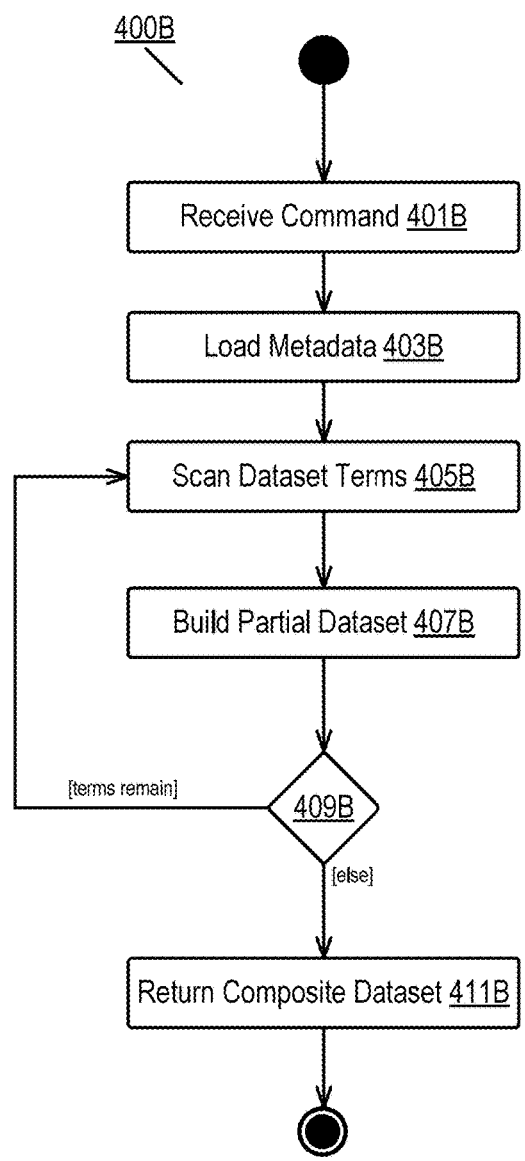
FIG. 4B is a flow diagram illustrating a method for building a composite dataset using metadata according to some embodiments of the disclosure.

FIG. 4B is a flow diagram illustrating a method for building a composite dataset using metadata according to some embodiments of the disclosure.

In step 401b, the method (400b) receives a command. In one embodiment, a command comprises a command to access one or more datasets, including annotation datasets. In one embodiment, a command is part of a language for accessing datasets (e.g., Pig or Hive). An exemplary command comprises a LOAD command in the Pig programing language.

In step 403b, the method (400b) loads metadata responsive to the command. In one embodiment, the command accesses an annotation dataset (e.g., dataset Z in FIG. 3A). In this example, the method (400b) loads the metadata file (generated using the method 400a) associated with the dataset. As described, this metadata file may be stored on the same disk as the underlying data file.

In some embodiments, in step 403b, the method (400b) de-serializes (and/or unmarshals) the metadata file to re-create the object representation of the metadata file.

In step 405b, the method (400b) scans the dataset terms (generated in step 405a).

As discussed in the context of FIG. 3B, the individual terms are stored as an array of terms. Since the terms are additive, the order of the terms is irrelevant. To create the composite dataset, the method (400b) iterates through the array, an operation which takes O(n) time, where n is the number of terms. Indeed, for a composite dataset having no vertical joins, the number of terms is one; thus, traversal of the terms is constant (O(1)).

In step 407b, the method (400b) builds a partial composite data set using a scanned term. In one embodiment, after identifying a term that describes a portion of the dataset (e.g., X1·Y·Z), the method (400b) accesses the metadata (403b) and re-constructs the portion of the composite dataset using the term. For example, the method (400b) uses the identification of datasets to identify the files and splits for each dataset and aligns these files and splits to form a partial dataset associated with a given term.

In step 409b, the method (400b) determines if all terms have been analyzed. If not, the method (400b) executes steps 405b and 407b for each remaining term. The result of step 409b comprises a set of partial datasets.

In step 411b, the method (400b) returns a composite dataset. In one embodiment, the composite dataset comprises a combination of the partial datasets. In one embodiment, the method (400b) combines the partial datasets based on the ordering of terms in the array of terms analyzed in step 405b. That is, while the terms may be processed out-of-order (or in parallel), the resulting dataset is aligned based on the term ordering in the metadata file. The resulting composite dataset thus appears as a single logical dataset to the end-user. Thus, the user may perform any operations on the composite dataset as if the composite dataset were a single dataset after the method (400b) completes.

Figure 6A:
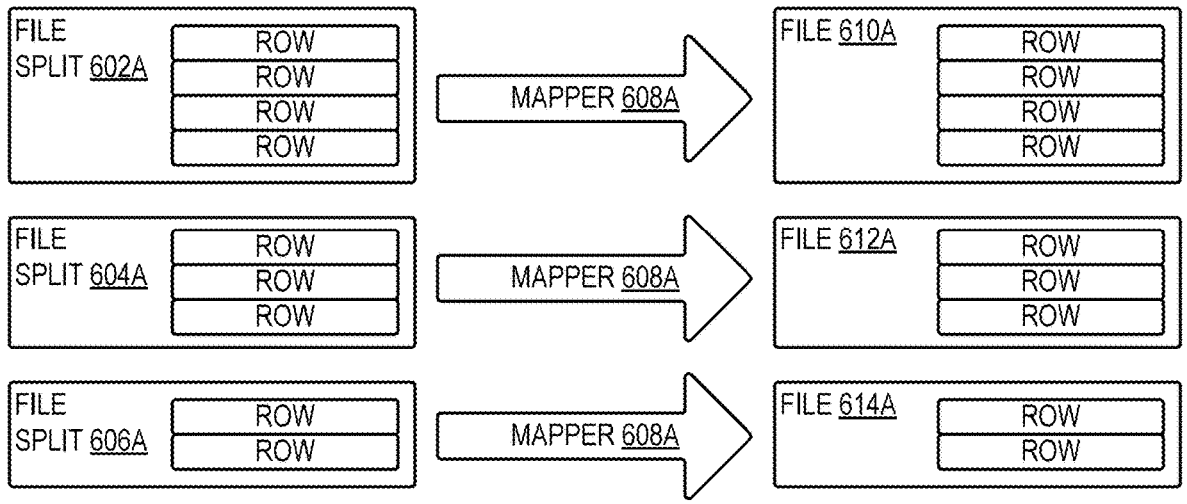
FIG. 6A is a diagram illustrating a mapping process performed in a distributed computing environment using a file-based alignment scheme according to some embodiments of the disclosure.

FIG. 6A is a diagram illustrating a mapping process performed in a distributed computing environment using a file-based alignment scheme according to some embodiments of the disclosure.

In one embodiment, the illustrated dataset comprises a root dataset, although composite datasets may also be read. Multiple physical files may be read when reading a dataset. As illustrated in FIG. 6A, a dataset is split based on file boundaries into three files (602a, 604a, 606a), each file containing a set of rows. In one embodiment, the system forces the distributed file system to split data based on file boundaries.

The system can generate an annotation dataset using a single mapper. As known in the art, mapper tasks are distributed to data nodes of a Hadoop system. The system causes the system to distribute the map task (608a) to each data node containing the files (602a, 604a, 606a). The map task (608a) is configured to operate on a single file. As described previously, the map task (608a) annotates the rows of a given file (602a, 604a, 606a) and generates annotation row identifiers for the resulting annotation dataset. In the illustrated embodiment, the writing is mapper only: no reduce phase is required to generate the output files (610a, 612a, 614a). In some embodiments, a reducer phase can be implemented if needed by the underlying ETL instructions. If a reducer phase (not illustrated) is included, a separate final partition reducer stage is needed.

The system generates annotation dataset metadata. In one embodiment, this may be performed by a reducer task. In one embodiment, the metadata describes the annotation dataset. The metadata may include structural metadata, split coordination metadata, and a schema. In some embodiments, the metadata for a given annotation set is stored in a file separate from the underlying data.

In general, the output annotation dataset is composed of horizontal and vertical unions of raw datasets. In some embodiments, each annotation dataset is assigned a unique identifier (e.g., a 64-bit identifier). Structural metadata provides the ID of the annotation dataset that the metadata describes as well as the ID's of the datasets from which the annotation dataset is constructed and how those sets are combined with one another. The split coordination metadata describes how the annotation data file is split. In the illustrated embodiment, the split coordination metadata includes a fixed-length array that enumerates all splits in the dataset. In the illustrated embodiment, elements of the array include a relative path name followed by a start and length that covers the entire file. In one embodiment, the schema metadata may comprise a list of columns added via the annotation dataset.

Further detail on metadata files for annotation datasets is provided in co-pending U.S. patent application Ser. No. 16/727,142.

The system writes the annotation dataset to disk. As illustrated, the output of the map task (608a) comprises files (610a, 612a, 614a), including rows representing the annotation data. Thus, as a final stage, the mappers (608a) write the annotation datasets to the files identified in the metadata file. Alternatively, if reducer stages are implemented, the reducer may write the files.

Figure 6B:
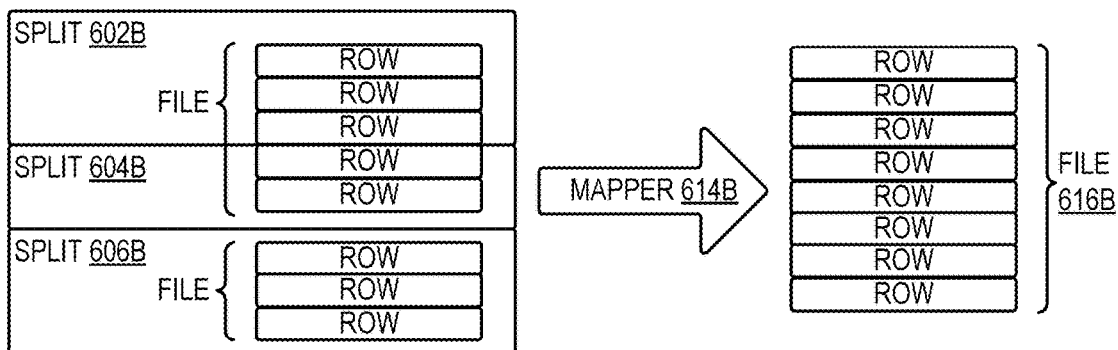
FIG. 6B is a diagram illustrating a mapping process performed in a distributed computing environment using a stripe-based alignment scheme according to some embodiments of the disclosure.
Figure 6B:
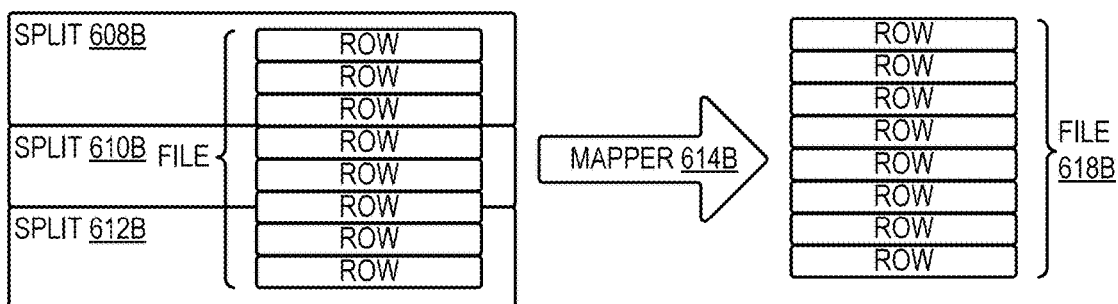

FIG. 6B is a diagram illustrating a mapping process performed in a distributed computing environment using a stripe-based alignment scheme according to some embodiments of the disclosure.

The system reads a dataset. In one embodiment, the dataset comprises a root dataset, although composite datasets may also be read. Multiple physical files may be read when reading a dataset. As illustrated in FIG. 6B, a dataset is split based on stripe boundaries into six splits (602b, 604b, 606b, 608b, 610b, 612b), each split containing a set of rows. Although described using stripes, RowGroups or other similar constructs may be used. As illustrated, a given file may span splits (e.g., 602b, 604b).

The system selects a set of stripes from a given dataset. In some embodiments, the system may select a preconfigured number of stripes based on system requirements (e.g., a preferred stripe length for output data). As illustrated in FIG. 6B, the resulting stripes may span multiple files. Thus, a stripe-based alignment mechanism enables a reduced number of data files for an annotation dataset since decisions are premised on stripes rather than files.

The system generates an annotation dataset using a single mapper. As known in the art, mapper tasks are distributed to data nodes of a Hadoop system. The system causes the system to distribute the map task (614b) to each data node containing the stripes (602b, 604b, 606b, 608b, 610b, 612b). The map task (614b) is configured to operate on a set of stripes in one or more splits. As described previously, the map task (614b) annotates the rows of a given split (602b, 604b, 606b, 608b, 610b, 612b) as well as generates annotation row identifiers for the resulting annotation dataset. In the illustrated embodiment, the writing is mapper only, but reducer phases may be added as described previously in connection with FIG. 6A.

The system generates annotation dataset metadata. In one embodiment, this may be performed by a reducer task. In one embodiment, the metadata describes the annotation dataset. The metadata may include structural metadata, split coordination metadata, and a schema, as described in the description of FIG. 6A. In contrast to the metadata generated in FIG. 6A, the split coordination metadata would include more entries containing file paths but would include smaller lengths and non-zero starting locations indicating stripe boundaries.

The system writes the annotation dataset to disk. As illustrated, the output of the map task (614b) comprises files (616b, 618b), including rows representing the annotation data. Thus, as a final stage, the mappers (614b) write the annotation datasets to the files identified in the metadata file. Alternatively, if reducer stages are implemented, the reducer may write the files.

Figure 5:
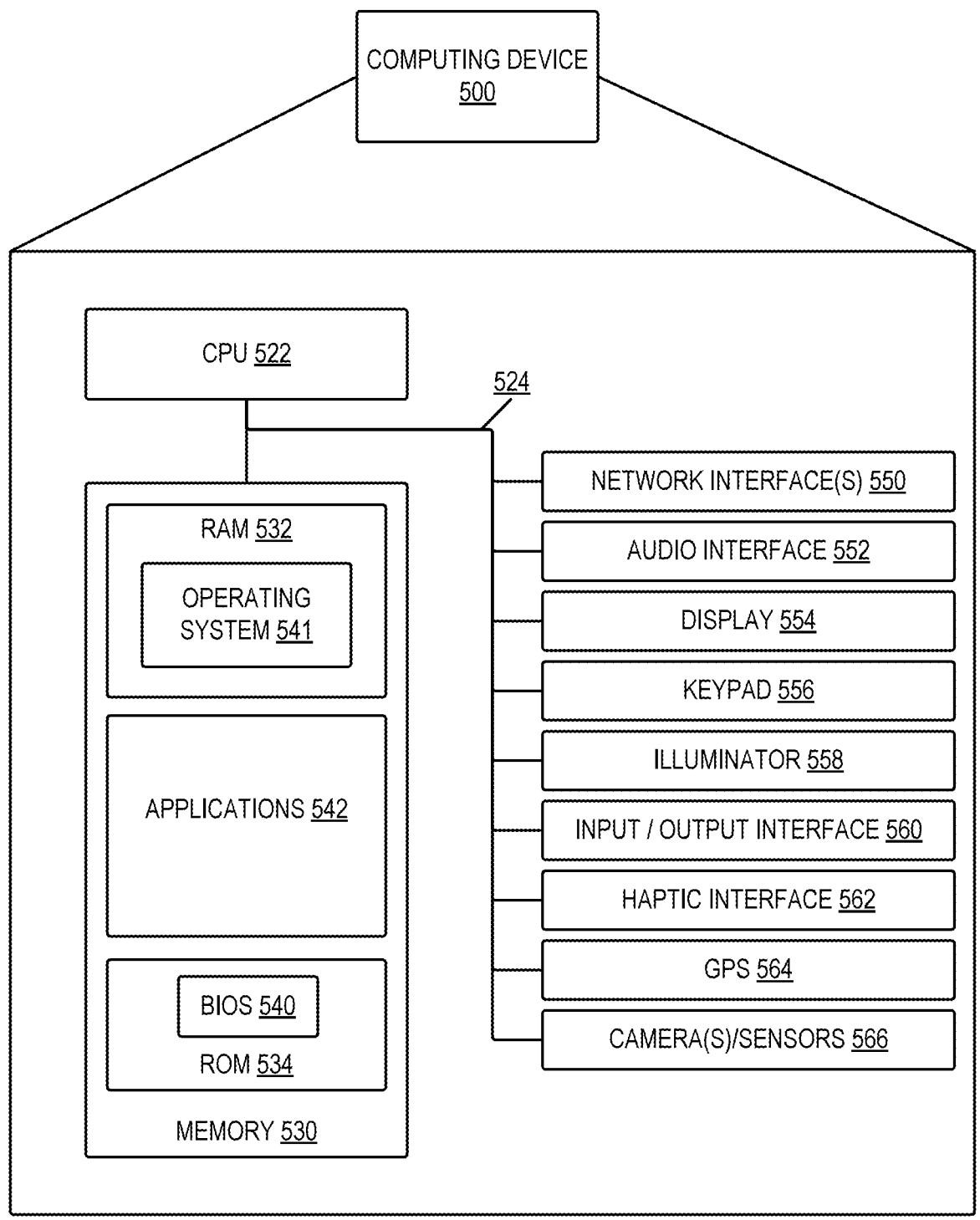
FIG. 5 is a schematic diagram illustrating a computing device showing an example embodiment of a client or server device that may be used within the present disclosure.

FIG. 5 is a schematic diagram illustrating a computing device showing an example embodiment of a client or server device that may be used within the present disclosure.

The computing device (500) may include more or fewer components than those shown in FIG. 5. For example, a server computing device may not include audio interfaces, displays, keypads, illuminators, haptic interfaces, GPS receivers, cameras, or sensors.

As shown in the figure, the device (500) includes a processing unit (CPU) (522) in communication with a mass memory (530) via a bus (524). Computing device (500) also includes one or more network interfaces (550), an audio interface (552), a display (554), a keypad (556), an illuminator (558), an input/output interface (560), a haptic interface (562), an optional global positioning systems (GPS) receiver (564) and a camera(s) or other optical, thermal, or electromagnetic sensors (566). Device (500) can include one camera/sensor (566), or a plurality of cameras/sensors (566), as understood by those of skill in the art. The positioning of the camera(s)/sensor(s) (566) on the device (500) can change per device (500) model, per device (500) capabilities, and the like, or some combination thereof.

The computing device (500) may optionally communicate with a base station (not shown), or directly with another computing device. Network interface (550) is sometimes known as a transceiver, transceiving device, or network interface card (NIC).

The audio interface (552) is arranged to produce and receive audio signals such as the sound of a human voice. For example, the audio interface (552) may be coupled to a speaker and microphone (not shown) to enable telecommunication with others and/or generate an audio acknowledgment for some action. Display (554) may be a liquid crystal display (LCD), gas plasma, light emitting diode (LED), or any other type of display used with a computing device. Display (554) may also include a touch-sensitive screen arranged to receive input from an object such as a stylus or a digit from a human hand.

Keypad (556) may comprise any input device arranged to receive input from a user. Illuminator (558) may provide a status indication and/or provide light.

The computing device (500) also comprises input/output interface (560) for communicating with external. Input/output interface (560) can utilize one or more communication technologies, such as USB, infrared, Bluetooth™, or the like. The haptic interface (562) is arranged to provide tactile feedback to a user of the client device.

Optional GPS transceiver (564) can determine the physical coordinates of the computing device (500) on the surface of the Earth, which typically outputs a location as latitude and longitude values. GPS transceiver (564) can also employ other geo-positioning mechanisms, including, but not limited to, triangulation, assisted GPS (AGPS), E-OTD, CI, SAI, ETA, BSS, or the like, to further determine the physical location of the computing device (500) on the surface of the Earth. In one embodiment, however, the computing device (500) may through other components, provide other information that may be employed to determine a physical location of the device, including, for example, a MAC address, Internet Protocol (IP) address, or the like.

Mass memory (530) includes a RAM (532), a ROM (534), and other storage means. Mass memory (530) illustrates another example of computer storage media for storage of information such as computer-readable instructions, data structures, program modules or other data. Mass memory (530) stores a basic input/output system ("BIOS") (540) for controlling the low-level operation of the computing device (500). The mass memory also stores an operating system (541) for controlling the operation of the computing device (500)

Applications (542) may include computer-executable instructions which, when executed by the computing device (500), perform any of the methods (or portions of the methods) described previously in the description of the preceding Figures. In some embodiments, the software and/or programs implementing the method embodiments can be read from hard disk drive (not illustrated) and temporarily stored in RAM (532) by CPU (522). CPU (522) may then read the software and/or data from RAM (532), process them, and store them to RAM (532) again.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

For the purposes of this disclosure, the term "user," "subscriber," "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
generating, by a processor, a tree representing a plurality of datasets;
parsing, by the processor, the tree into an algebraic representation of the tree;
identifying, by the processor, a plurality of terms in the algebraic representation, each term in the terms comprising at least two factors, each of the two factors associated with a dataset in the plurality of datasets;
generating, by the processor, a metadata object of the plurality of terms;
serializing, by the processor, the metadata object to generate serialized terms;
storing, by the processor, the serialized terms in a metadata file associated with the plurality of datasets; and
re-constructing, by the processor, a composite dataset including the plurality of datasets in response to a command by generating at least one partial dataset based on the serialized terms.

2. The method of claim 1, the generating a tree comprising identifying a root node of the tree, the root node comprising a right-most dataset in the plurality of datasets; and identifying one or more child nodes, the child nodes including at least one child node associated with a root dataset.

3. The method of claim 2, the parsing the tree comprising identifying at least one vertical join and representing the vertical join as a summation.

4. The method of claim 1, the parsing the tree comprising identifying at least one horizontal join and representing the horizontal join as a product.

5. The method of claim 1, the identifying a plurality of terms comprising expanding the algebraic representation by factoring the algebraic representation.

6. The method of claim 1, the serializing the metadata object comprising generating a binary representation of the plurality of terms.

7. The method of claim 1, wherein re-constructing the composite dataset further comprises:
   receiving, by the processor, the command;
   loading, by the processor, the metadata file;
   scanning, by the processor, the plurality of terms in the metadata file; and
   building, by the processor, the composite dataset based on the scanning.

8. A non-transitory computer-readable storage medium for tangibly storing computer program instructions capable of being executed by a computer processor, the computer program instructions defining the steps of:
   generating a tree representing a plurality of datasets;
   parsing the tree into an algebraic representation of the tree;
   identifying a plurality of terms in the algebraic representation, each term in the terms comprising at least two factors, each of the two factors associated with a dataset in the plurality of datasets;
   generating a metadata object of the plurality of terms;
   serializing the metadata object to generate serialized terms;
   storing the serialized terms in a metadata file associated with the plurality of datasets: and
   re-constructing a composite dataset including the plurality of datasets in response to a command by generating at least one partial dataset based on the serialized terms.

9. The non-transitory computer-readable storage medium of claim 8, the generating a tree comprising identifying a root node of the tree, the root node comprising a right-most dataset in the plurality of datasets; and identifying one or more child nodes, the child nodes including at least one child node associated with a root dataset.

10. The non-transitory computer-readable storage medium of claim 8, the parsing the tree comprising identifying at least one horizontal join and representing the horizontal join as a product.

11. The non-transitory computer-readable storage medium of claim 10, the parsing the tree comprising identifying at least one vertical join and representing the vertical join as a summation.

12. The non-transitory computer-readable storage medium of claim 8, the identifying a plurality of terms comprising expanding the algebraic representation by factoring the algebraic representation.

13. The non-transitory computer-readable storage medium of claim 8, the serializing the metadata object comprising generating a binary representation of the plurality of terms.

14. The non-transitory computer-readable storage medium of claim 8, wherein re-constructing the composite dataset further comprises:
   receiving, by the processor, the command;
   loading, by the processor, the metadata file;
   scanning, by the processor, the plurality of terms in the metadata file; and
   building, by the processor, the composite dataset based on the scanning.

15. An apparatus comprising:
   a processor; and
   a storage medium for tangibly storing thereon program logic for execution by the processor, the stored program logic causing the processor to perform the operations of:
      generating a tree representing a plurality of datasets,
      parsing the tree into an algebraic representation of the tree,
      identifying a plurality of terms in the algebraic representation, each term in the terms comprising at least two factors, each of the two factors associated with a dataset in the plurality of datasets,
      generating a metadata object of the plurality of terms,
      serializing the metadata object to generate serialized terms,
      storing the serialized terms in a metadata file associated with the plurality of datasets and
      re-constructing a composite dataset including the plurality of datasets in response to a command by generating at least one partial dataset based on the serialized terms.

16. The apparatus of claim 15, the generating a tree comprising identifying a root node of the tree, the root node comprising a right-most dataset in the plurality of datasets; and identifying one or more child nodes, the child nodes including at least one child node associated with a root dataset.

17. The apparatus of claim 15, the parsing the tree comprising identifying at least one horizontal join and representing the horizontal join as a product.

18. The apparatus of claim 17, the parsing the tree comprising identifying at least one vertical join and representing the vertical join as a summation.

19. The apparatus of claim 15, the identifying a plurality of terms comprising expanding the algebraic representation by factoring the algebraic representation.

20. The apparatus of claim 15, the serializing the metadata object comprising generating a binary representation of the plurality of terms.

* * * * *